United States Patent
Chung et al.

(10) Patent No.: US 8,427,606 B2
(45) Date of Patent: Apr. 23, 2013

(54) LIQUID CRYSTAL DISPLAY COMPRISING A REFLECTIVE POLARIZING LAYER INCLUDING A PLURALITY OF MICROFIBERS EACH HAVING AN ANISOTROPIC REFRACTIVE INDEX AND LONGITUDINALLY EXTENDING IN THE SAME DIRECTION

(75) Inventors: Seunghwan Chung, Anyang-si (KR); Gicherl Kim, Asan-si (KR); Insun Hwang, Suwon-si (KR); Donghoon Kim, Suwon-si (KR); Dong-Yeol Yeom, Asan-si (KR)

(73) Assignee: Samsung Display Co., Ltd. (KR)

( * ) Notice: Subject to any disclaimer, the term of this patent is extended or adjusted under 35 U.S.C. 154(b) by 222 days.

(21) Appl. No.: 12/763,516

(22) Filed: Apr. 20, 2010

(65) Prior Publication Data

US 2010/0315576 A1    Dec. 16, 2010

(30) Foreign Application Priority Data

Jun. 15, 2009    (KR) ................. 10-2009-0052971

(51) Int. Cl.
*G02F 1/1335* (2006.01)
*G02F 1/1333* (2006.01)

(52) U.S. Cl.
USPC ................ 349/96; 349/87; 349/115

(58) Field of Classification Search ........... 349/87, 349/96, 113, 114, 139, 143
See application file for complete search history.

(56) References Cited

U.S. PATENT DOCUMENTS

| 5,825,543 | A | 10/1998 | Ouderkirk et al. | |
|---|---|---|---|---|
| 7,356,229 | B2 | 4/2008 | Ouderkirk et al. | |
| 7,356,231 | B2 | 4/2008 | Ouderkirk et al. | |
| 7,386,212 | B2 | 6/2008 | Ouderkirk et al. | |
| 7,406,239 | B2 | 7/2008 | Ouderkirk et al. | |
| 2004/0165133 | A1* | 8/2004 | Tasaka et al. | 349/124 |
| 2007/0153162 | A1* | 7/2007 | Wright et al. | 349/96 |
| 2007/0153384 | A1 | 7/2007 | Ouderkirk et al. | |
| 2007/0281157 | A1 | 12/2007 | Laney et al. | |
| 2008/0057277 | A1* | 3/2008 | Bluem et al. | 428/212 |
| 2008/0057278 | A1 | 3/2008 | Benson et al. | |
| 2009/0073353 | A1* | 3/2009 | Yu et al. | 349/96 |
| 2009/0109375 | A1* | 4/2009 | Obata et al. | 349/74 |
| 2009/0296021 | A1* | 12/2009 | Lee et al. | 349/64 |

FOREIGN PATENT DOCUMENTS

| JP | 2006215485 A | 8/2006 |
|---|---|---|
| JP | 2006215486 A | 8/2006 |
| KR | 1020060056338 A | 5/2006 |
| KR | 1020070114776 A | 12/2007 |

* cited by examiner

*Primary Examiner* — Bumsuk Won
*Assistant Examiner* — Paul Lee
(74) *Attorney, Agent, or Firm* — Cantor Colburn LLP

(57) ABSTRACT

A liquid crystal display includes a light source, a liquid crystal display panel including a pixel having a plurality of a color sub-pixel, and a reflective polarizer disposed between the light source and the liquid crystal display panel to transmit or reflect a light according to a direction in which the light vibrates. The reflective polarizer includes a reflective polarizing layer including a plurality of microfibers which each extend in a same direction with respect to each other, and a protective layer overlapping the reflective polarizing layer. A thickness of the reflective polarizing layer is a function of a pixel size.

11 Claims, 13 Drawing Sheets

LIQUID CRYSTAL DISPLAY COMPRISING A REFLECTIVE POLARIZING LAYER INCLUDING A PLURALITY OF MICROFIBERS EACH HAVING AN ANISOTROPIC REFRACTIVE INDEX AND LONGITUDINALLY EXTENDING IN THE SAME DIRECTION

This application claims priority to Korean Patent Application No. 2009-52971 filed on Jun. 15, 2009, and all the benefits accruing therefrom under 35 U.S.C. §119, the contents of which are herein incorporated by reference in its entirety.

BACKGROUND OF THE INVENTION

1. Field of the Invention

The invention relates to a liquid crystal display and a method of manufacturing the liquid crystal display. More particularly, the invention relates to a liquid crystal display having improved brightness characteristics and a method of manufacturing the liquid crystal display.

2. Description of the Related Art

A liquid crystal display ("LCD"), which is one of flat panel displays, includes a light source, a liquid crystal display panel that receives light from the light source to display images thereon, and polarizers arranged on incident and exit surfaces of the liquid crystal display panel to polarize the light.

The polarizers transmit the light (hereinafter, referred to as P-polarized light) that vibrates in one direction of the light provided to the liquid crystal display panel, while absorbing the light (hereinafter, referred to as S-polarized light) that vibrates in a perpendicular direction. Therefore, some of the light generated by the light source is lost by the polarizers, so that brightness characteristics of the LCD are deteriorated and power consumption of the LCD increases to compensate the loss of the light, occurring in the polarizers.

BRIEF SUMMARY OF THE INVENTION

An exemplary embodiment of the invention provides a liquid crystal display having an improved brightness.

Another exemplary embodiment of the invention also provides a method of manufacturing the liquid crystal display.

According to an exemplary embodiment of the invention, a liquid crystal display includes a light source, a liquid crystal display panel including a pixel which includes a plurality of color sub-pixels and receives a light from the light source to display images thereon, and a reflective polarizer arranged in between the light source and the liquid crystal display panel to transmit or reflect the light according to a direction in which the light vibrates.

In addition, the reflective polarizer includes a reflective polarizing layer having an anisotropic refractive index and including a plurality of microfibers that extends in a same direction with respect to each other, and a protective layer overlapping the reflective polarizing layer. An amount of the light generated from the light source and exiting from the liquid crystal display panel is changed depending on a thickness of the reflective polarizing layer. The thickness of the reflective polarizing layer, which corresponds to a maximum value of the amount of the light, is a function of a size of the pixel.

According to another exemplary embodiment of the invention, a method of manufacturing the liquid crystal display includes forming a reflective polarizer which transmits or reflects a light according to a direction in which the light vibrates. A liquid crystal display panel including a pixel including a plurality of color sub-pixels is coupled with a light source. The reflective polarizer is arranged between the light source and the liquid crystal display panel.

In forming a reflective polarizer, a first optical member including a plurality of microfibers which extends in a same direction with respect to each other and has an anisotropic refractive index, is coupled with a second optical member that has an isotropic refractive index, such that the first optical member crosses the second optical member. An upper protective layer and a lower protective layer are arranged such that both the first optical member and the second optical member are positioned between the upper and lower protective layers. The upper protective layer, the lower protective layer, the first optical member, and the second optical member are pressed to each other to form a reflective polarizing layer including the first optical member between the upper protective layer and the lower protective layer.

An amount of the light generating from the light source and exiting from the liquid crystal display panel is changed depending on a thickness of the reflective polarizing layer. The thickness of the reflective polarizing layer, which corresponds to a maximum value of the amount of the light, is a function of a size of the pixel.

When the first optical member, the second optical member, the upper protective layer, and the lower protective layer are pressed to each other, the second optical member, the upper and lower protective layers are integrated by melting, and the first optical member remains between the upper protective layer and the lower protective layer. The second optical member becomes a portion of the upper and lower protective layers.

According to the exemplary embodiments, the reflective polarizer may improve a light-use efficiency of the light used to display the images in the liquid crystal display ("LCD"), thereby improving the brightness of the LCD. In addition, the thickness of the reflective polarizing layer of the reflective polarizer may be defined based on a pixel pitch of the liquid crystal display panel, to thereby maximize the brightness in the LCD.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Figure 1:
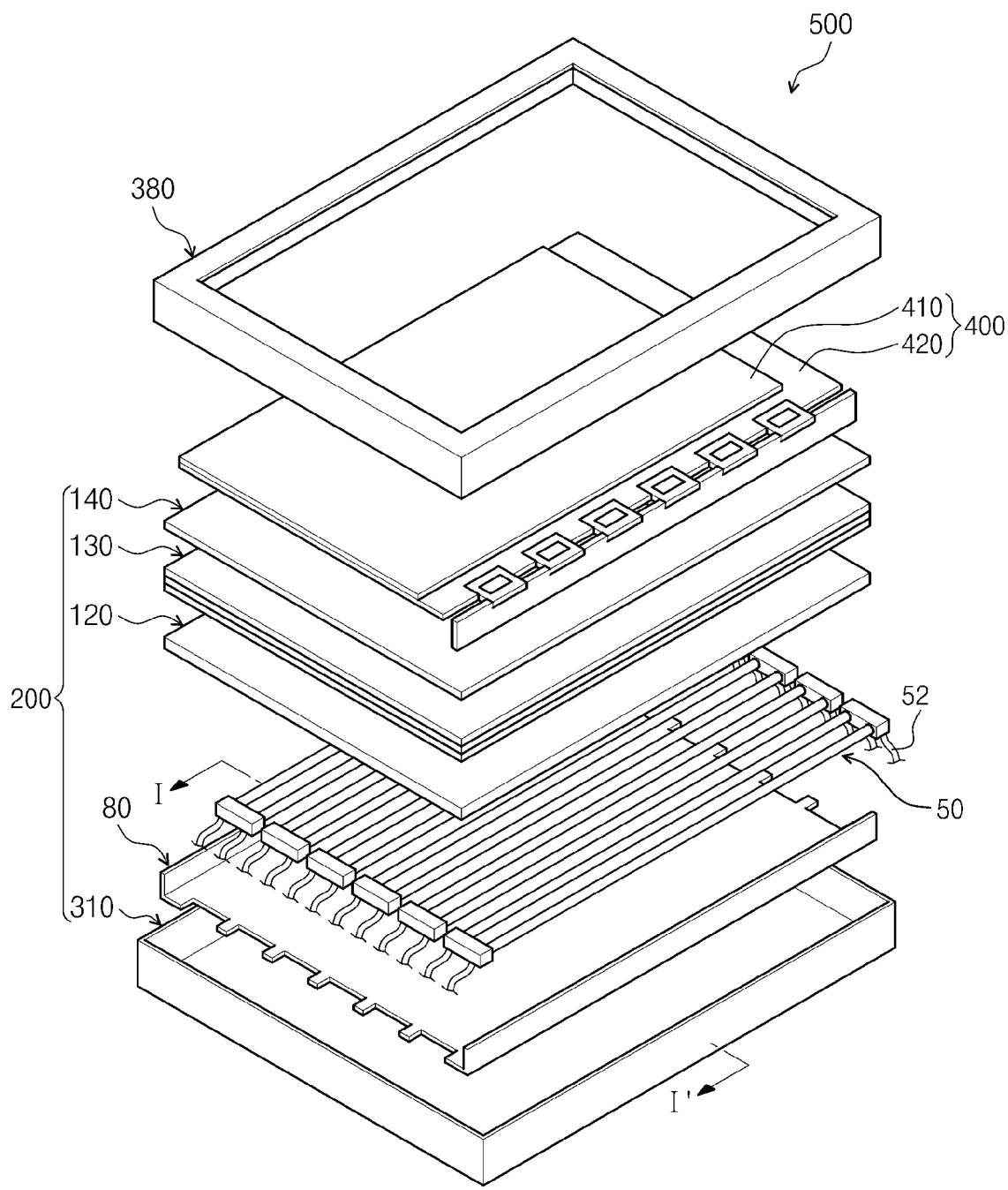
FIG. 1 is an exploded perspective view showing an exemplary embodiment of a liquid crystal display according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
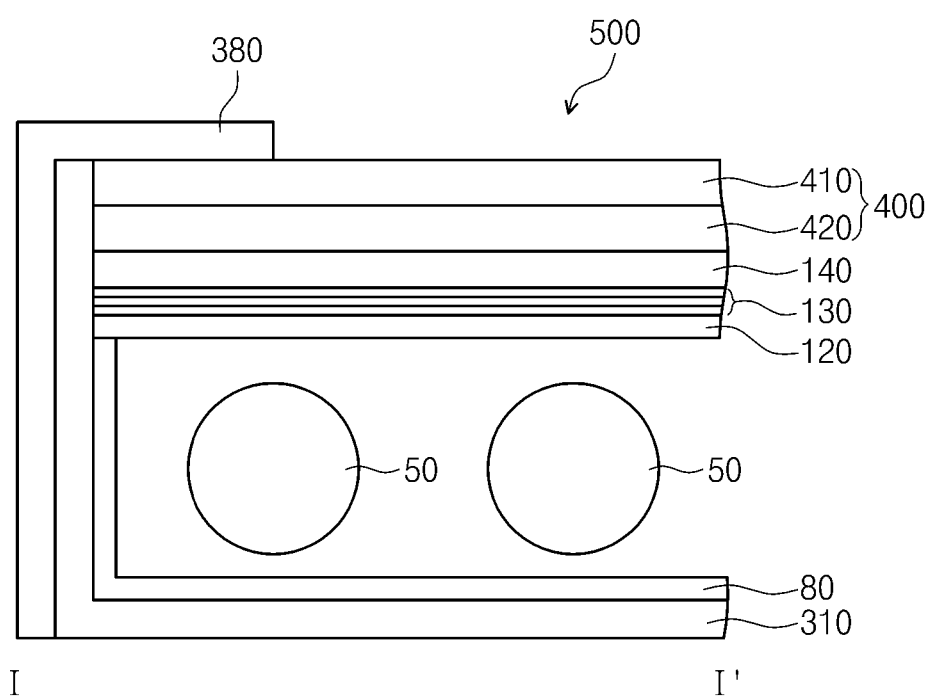
FIG. 2 is a cross-sectional view partially taken along line I-I' of FIG. 1.

FIG. 1 is an exploded perspective view showing an exemplary embodiment of a liquid crystal display according to the invention, and FIG. 2 is a cross-sectional view partially taken along line I-I' of FIG. 1.

Referring to FIGS. 1 and 2, a liquid crystal display ("LCD") 500 includes a backlight assembly 200 generating a light, and a liquid crystal display panel 400 receiving the light from the backlight assembly 200 to display images thereon.

The backlight assembly 200 includes a plurality of a lamp 50, a reflection plate 80, a bottom chassis 310 receiving the lamps 50 and the reflection plate 80, a diffusion plate 120, a plurality of optical sheets 130, and a reflective polarizer 140. The reflection plate 80, the bottom chassis 310, the diffusion plate 120, each of the plurality of optical sheets 130 and/or the reflective polarizer 140 is a single unitary and indivisible monolith, as illustrated in FIGS. 1 and 2.

Each lamp 50 is a line light source and is arranged on and overlapping the reflection plate 80 with a substantially uniform interval. A lamp electrode line 52 is electrically and physically connected to an electrode of each of the lamps 50, so that an electric power generated from an inverter (not shown) may be applied to the lamps 50 through the lamp electrode line 52.

As an alternative exemplary embodiment of the invention, the lamps 50 may be a point light source, such as a light emitting diode ("LED") or an organic light emitting diode ("OLED"), however the lamps are not be limited thereto or thereby.

In addition, in the illustrated exemplary embodiment, the backlight assembly 200 is a direct illumination type backlight assembly, and thus the lamps 50 are positioned directly below and overlapping the liquid crystal display panel 400 in a plan view of the LCD 500. However, the backlight assembly 200 should not be limited thereto or thereby, and the LCD 500 may include an edge illumination type backlight assembly or other configurations.

The reflection plate 80 includes a material that reflects a light, such as polyethylene terephthalate ("PET") or aluminum. The reflection plate 80 is arranged on and overlapping a bottom portion of the bottom chassis 310. The light generated by the lamps 50 and reaching to the reflection plate 80, instead of proceeding to the liquid crystal display panel 400, may be provided to the liquid crystal display panel 400 by the reflection plate 80 since the reflection plate 80 reflects and redirects the light towards the liquid crystal display panel 400.

In the illustrated exemplary embodiment, the LCD 500 includes the lamps 50 positioned below the liquid crystal display panel 400, that is, on a side of the liquid crystal display panel 400 opposing a viewing side of the LCD 500 with respect to the liquid crystal display panel 400. However, the position of the lamps 50 may be changed.

In an alternative exemplary embodiment, the lamps 50 may be positioned directly adjacent to at least one inner portion of the side walls of the bottom chassis 310, such as for an edge illumination type backlight assembly. Where the lamps 50 are positioned directly adjacent to the one inner portion of the side walls of the bottom chassis 310, the backlight assembly 200 may further include a light guide plate (not shown). That is, the lamps 50 may be positioned adjacent to a side portion (e.g., side incident surface) of the light guide plate, so that the light generated by the lamps 50 may be guided to the liquid crystal display panel 400 through the light guide plate.

The diffusion plate 120 is arranged on and overlapping the lamps 50 in the plan view of the LCD 500, to diffuse the light from the lamps 50. As a result, the light generated by the lamps 50 may be uniformly provided to the liquid crystal display panel 400 by the diffusion plate 120.

The optical sheets 130 are arranged on and overlapping the diffusion plate 120 in the plan view of the LCD 500. In an exemplary embodiment, the optical sheets 130 may include a prism sheet that condenses the light transmitted through the diffusion plate 120 to improve front brightness, and a diffusion sheet that further diffuses the light from the diffusion plate 120.

Where the optical sheets 130 include the prism sheet, the prism sheet may be arranged between the liquid crystal display panel 400 and the reflective polarizer 140. When the prism sheet is arranged between the liquid crystal display panel 400 and the reflective polarizer 140, the prism sheet may directly condense the light scattered by the reflective polarizer 140 due to a non-uniform thickness of the reflective polarizer 140, thereby improving overall brightness of the LCD 500.

As illustrated in FIG. 1, The reflective polarizer 140 is arranged between the backlight assembly 200 and the liquid crystal display panel 400. The reflective polarizer 140 transmits and/or reflects the light generated by the lamps 50 according to a direction in which the light vibrates. More detailed descriptions about structure and function of the reflective polarizer 140 will be described with reference to FIGS. 3A and 3B.

The liquid crystal display panel 400 includes a first substrate 420 in which a thin film transistor is disposed and a second substrate 410 facing the first substrate 420. The first substrate 420 includes a plurality of a pixel 415 (shown in FIG. 4B), each of which includes a plurality of sub-pixels 411, 412, and 413 (shown in FIG. 4B). Each sub-pixel 411, 412 and 413 includes the thin film transistor (not shown) and a pixel electrode PE (shown in FIG. 4A) that is electrically connected to the thin film transistor.

The second substrate 410 includes a plurality of color filters (not shown), each of which are arranged in a one-to-one correspondence relationship with the sub-pixels, and a common electrode (not shown) that forms an electric field with the pixel electrode PE. Thus, a director of a liquid crystal 405 (shown in FIG. 3A) interposed between the first substrate 420 and the second substrate 410 is changed in response to the electric field formed by the pixel electrode PE and the common electrode, so that an amount of the light passing through the first and second substrates 420 and 410 is controlled.

According to an alternative exemplary embodiment of the invention, the color filters arranged in a one-to-one correspondence relationship with the sub-pixels may be disposed on the first substrate 420. Also, the first substrate 420 may include the common electrode instead of disposing the common electrode on the second substrate 410. When the common electrode is disposed on the first substrate 420, the common electrode may serve as an opposite electrode that forms a horizontal electric field with the pixel electrode PE to control the director of the liquid crystal.

The bottom chassis 310 includes the bottom portion and the side walls extended from the bottom portion, to provide a receiving space therebetween, and the reflection plate 80 and the lamps 50 are received in the receiving space. The diffusion plate 120, the optical sheets 130, the reflective polarizer 140, and the liquid crystal display panel 400 are sequentially arranged, and disposed on the lamps 50. A top chassis 380 is coupled with the bottom chassis 310 to cover an edge of the liquid crystal display panel 400.

Figure 3A:
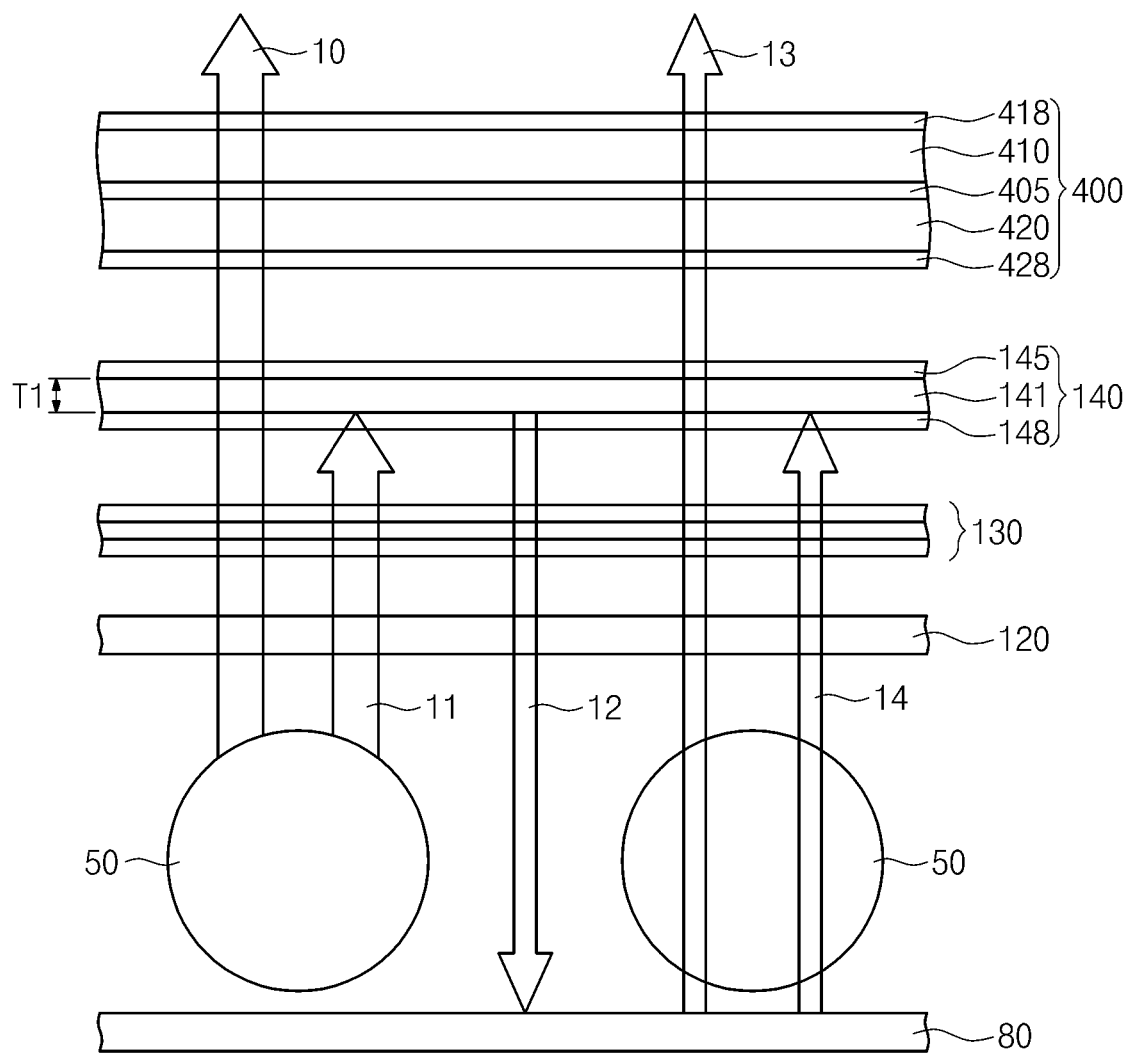
FIG. 3A is a view illustrating a function of an exemplary embodiment of a reflective polarizer.
Figure 3B:
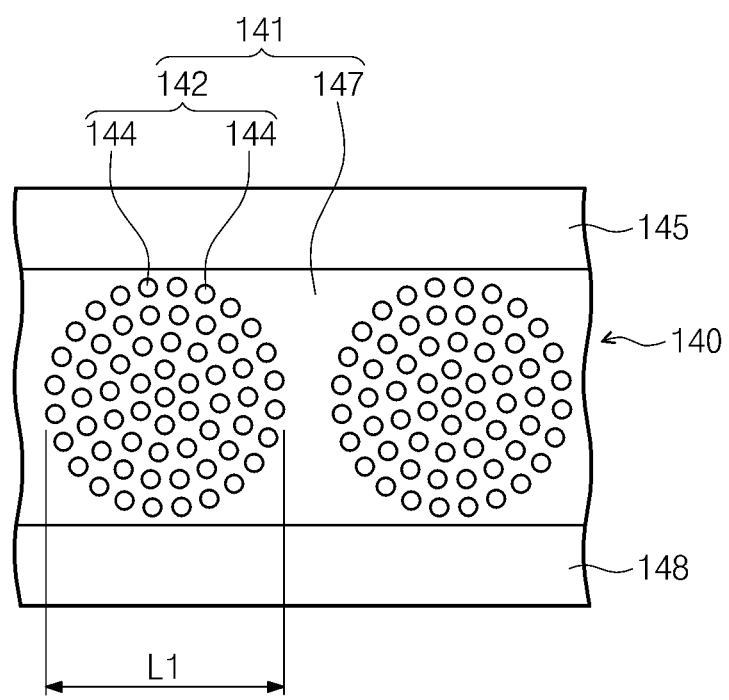
FIG. 3B is a partially enlarged cross-sectional view showing an exemplary embodiment of a reflective polarizing layer of FIG. 3A.

FIG. 3A is a view illustrating a function of an exemplary embodiment of the reflective polarizer, and FIG. 3B is a partially enlarged cross-sectional view showing an exemplary embodiment of a reflective polarizing layer of FIG. 3A.

Referring to FIG. 3A, the reflection plate 80 is disposed facing a lower portion (e.g., surface) of the lamps 50. The diffusion plate 120, the optical sheets 130, the reflective polarizer 140, and the liquid crystal display panel 400 are sequentially arranged disposed on the lamps 50, in a direction towards the viewing side of the LCD 500.

The reflective polarizer 140 includes a reflective polarizing layer 141, an upper protective layer 145 arranged on and facing an upper surface of the reflective polarizing layer 141, and a lower protective layer 148 arranged on and facing a lower surface of the reflective polarizing layer 141. The upper protective layer 145, the reflective polarizing layer 141 and/or the lower protective layer 148 is a single unitary and indivisible monolith, as illustrated in FIGS. 1 and 2.

The liquid crystal display panel 400 includes the first substrate 420 in which the thin film transistor is disposed, the second substrate 410 facing the first substrate 420, and the liquid crystal layer 405 interposed between the first substrate 420 and the second substrate 410. In addition, the liquid crystal display panel 400 includes a first polarizer 428 arranged on a light incident surface of the first substrate 420 and a second polarizer 418 arranged on a light exit surface (e.g., viewing side surface) of the second substrate 410.

The light generated by the lamps 50 sequentially passes through the diffusion plate 120, the optical sheets 130, and the reflective polarizer 140 to be applied to the liquid crystal display panel 400. The reflective polarizer 140 transmits or reflects the light according to the direction in which the light vibrates. In the reflective polarizer 140, a light axis through which the light travels is substantially parallel to a transmission axis of the first polarizer 428, and a light axis from which the light is reflected is substantially parallel to an absorption axis of the first polarizer 428.

In one exemplary embodiment, a P-polarized light and an S-polarized light, which are vibrated in different directions, are defined. The first polarizer 428 and the reflective polarizer 140 transmit the P-polarized light therethrough, the first polarizer 428 absorbs the S-polarized light, and the reflective polarizer 140 (specifically the reflective polarizing layer 141) reflects the S-polarized light, where the light generated by the lamps 50 includes a first P-polarized light 10 and a first S-polarized light 11, since the light generated by the lamps 50 vibrates in various directions. As a result, the first P-polarized light 10 sequentially passes through the reflective polarizer 140 including the reflective polarizing layer 141 and the first polarizer 428 and is used to display images on the liquid crystal display panel 400. However, the first S-polarized light 11 is reflected by the reflective polarizing layer 141 of the reflective polarizer 140 and changed into a second S-polarized light 12 that travels in a reverse direction toward the reflection plate 80.

While the second S-polarized light 12 is reflected by the reflection plate 80 and travels back towards the reflective polarizer 140, the second S-polarized light 12 is divided into a second P-polarized light 13 and a third S-polarized light 14. As a result, similar to the first P-polarized light 10, the second P-polarized light 13 passes through the reflective polarizer 140 including the reflective polarizing layer 141 and the first polarizer 428 to be used to display the images on the liquid crystal display panel 400, and the third S-polarized light 14 is divided into the P-polarized light and the S-polarized light by the reflective polarizing layer 141 of the reflective polarizer 140.

The reflective polarizer 140 repeatedly filters (e.g., transmits and reflects) the light according to the direction in which the light vibrates, such that only the light that is able to pass through the first polarizer 428 to be used to display the images is provided to the liquid crystal display panel 400 by the reflective polarizer 140, thereby improving the brightness of the liquid crystal display panel 400.

The reason why the reflective polarizer 140 has the above-described optical characteristics is because the reflective polarizer 140 of the invention includes a plurality of microfibers that has an anisotropic refractive index, and is dispersed in a medium having an isotropic refractive index. Particularly, the reflective polarizing layer 141 of the reflective polarizer 140 reflects a linear polarized light component that vibrates in a certain direction according to a refractive index difference between the medium and the microfibers, and transmits a linear polarized light component that vibrates in a different direction from the certain direction. That is, since the reflective polarizing layer 141 of the reflective polarizer 140 includes the microfibers, a multi-layered effect may be achieved due to boundaries of the microfibers even though the reflective polarizing layer 141 of the reflective polarizer 140 has a single-layer structure, thereby improving a reflective polarizing function of the reflective polarizer 140.

More detailed descriptions about a structure of the reflective polarizer 140 including the reflective polarizing layer 141 will be described in detail with reference to FIG. 3B.

Referring to FIG. 3B, both the upper protective layer 145 and the lower protective layer 148 cover (e.g., overlap) an entire of the upper and lower surfaces of the reflective polarizing layer 141, respectively. The upper protective layer 145 and the lower protective layer 148 may include a material that has the isotropic refractive index and transmits the light therethrough. In one exemplary embodiment, the upper protective layer 145 and/or the lower protective layer 148 may include polycarbonate ("PC"), polyethylene terephthalate ("PET"), or CoPET that is a copolymer of PET and PC.

The reflective polarizing layer 141 includes a plurality of first optical members 142. In the illustrated exemplary embodiment, each of the first optical members 142 includes a plurality of a microfiber 144 each having the anisotropic refractive index and a substantially linear longitudinal (e.g., elongated) shape. An entire of the first optical members 142 is disposed within boundaries of the reflective polarizing layer 141.

In one exemplary embodiment, a refractive index of the microfibers 144 with respect to a first direction is different from a refractive index of the microfibers 144 with respect to a second direction that is substantially perpendicular to the first direction. The microfibers 144 have the anisotropic refractive index since each of the microfibers 144 includes a material that has the anisotropic refractive index to a direction in which the material is elongated, such as polyethylene naphthalate ("PEN") or CoPEN. Thus, in case that the microfibers 144 are elongated to one direction, the microfibers 144 have the anisotropic refractive index in the direction in which the microfibers 144 are elongated.

Due to the optical characteristics of the microfibers 144 described above, the reflective polarizing layer 141 including the first optical members 142 may have the anisotropic refractive index.

In the illustrated exemplary embodiment, the reflective polarizing layer 141 may have a first thickness T1 (shown in FIG. 3A) of about 50 micrometers to about 1,000 micrometers. When the first thickness T1 is below 50 micrometers, it is difficult to form the first optical member 142 having the above-mentioned optical characteristics in the reflective polarizing layer 141, in view of a manufacturing process of the reflective polarizer 140. In addition, when the first thickness T1 is over 1,000 micrometers, a total thickness of the reflective polarizer 140 increases and the reflective polarizer 140 may not easily bend or flex. Therefore, it is difficult to assemble the backlight assembly 200 (shown in FIG. 1) including the reflective polarizer 140.

An intermediate material 147 is disposed between first optical members 142 which are directly adjacent to each other. The intermediate material 147 is disposed in an entire of an area between the first optical members 142, the upper protective layer 145 and the lower protective layer 148. In an exemplary embodiment the intermediate material 147 may be formed by melting a second optical member 143 (shown in FIG. 10), the upper protective layer 145 and the lower protective layer 148. The intermediate material 147 may include the same material as the upper protective layer 145 and the lower protective layer 148. The intermediate material 147 may be integrally formed with the upper protective layer 145 and the lower protective layer 148, such that the upper protective layer 145, the intermediate material 147 and the lower protective layer 148 collectively form a single unitary indivisible monolith. Also, since the intermediate material 147 has the isotropic refractive index substantially the same or the same as the lower protective layer 148 and the upper protective layer 145, and has the same refractive index substantially the same or the same as the upper protective layer 145 and the lower protective layer 148, light is thereby transmitted through the reflective polarizer 140.

The reason that the intermediate material 147 is melted and formed with the second optical member 143, the upper protective layer 145 and the lower protective layer 148 is as follows. In an exemplary embodiment of a manufacturing process of the reflective polarizer 140, each of the first optical member 142 and the second optical member 143 are pressed together with the upper protective layer 145 and the lower protective layer 148, respectively. Then, the second optical member 143, the upper protective layer 145, and the lower protective layer 148 are melted together, such that the pre-melted form of the first optical member 142 remains disposed in the reflective polarizing layer 141 and between the upper protective layer 145 and the lower protective layer 148, while the second optical member 143 effectively becomes the intermediate material 147 shown in FIG. 3B.

Only the intermediate material 147 remains as a residual substance after the second optical member 143, the upper protective layer 145, and the lower protective layer 148 are melted together, and the second optical member 143 has not been illustrated in FIG. 3B. Alternatively, according to a process condition applied to manufacture the reflective polarizer 140, a portion of the originally provided form of the second optical member 143 may remain at a position in which the intermediate material 147 is filled in the reflective polarizing layer 141. More detailed description about the above will be described with reference to FIG. 10.

Figure 10:
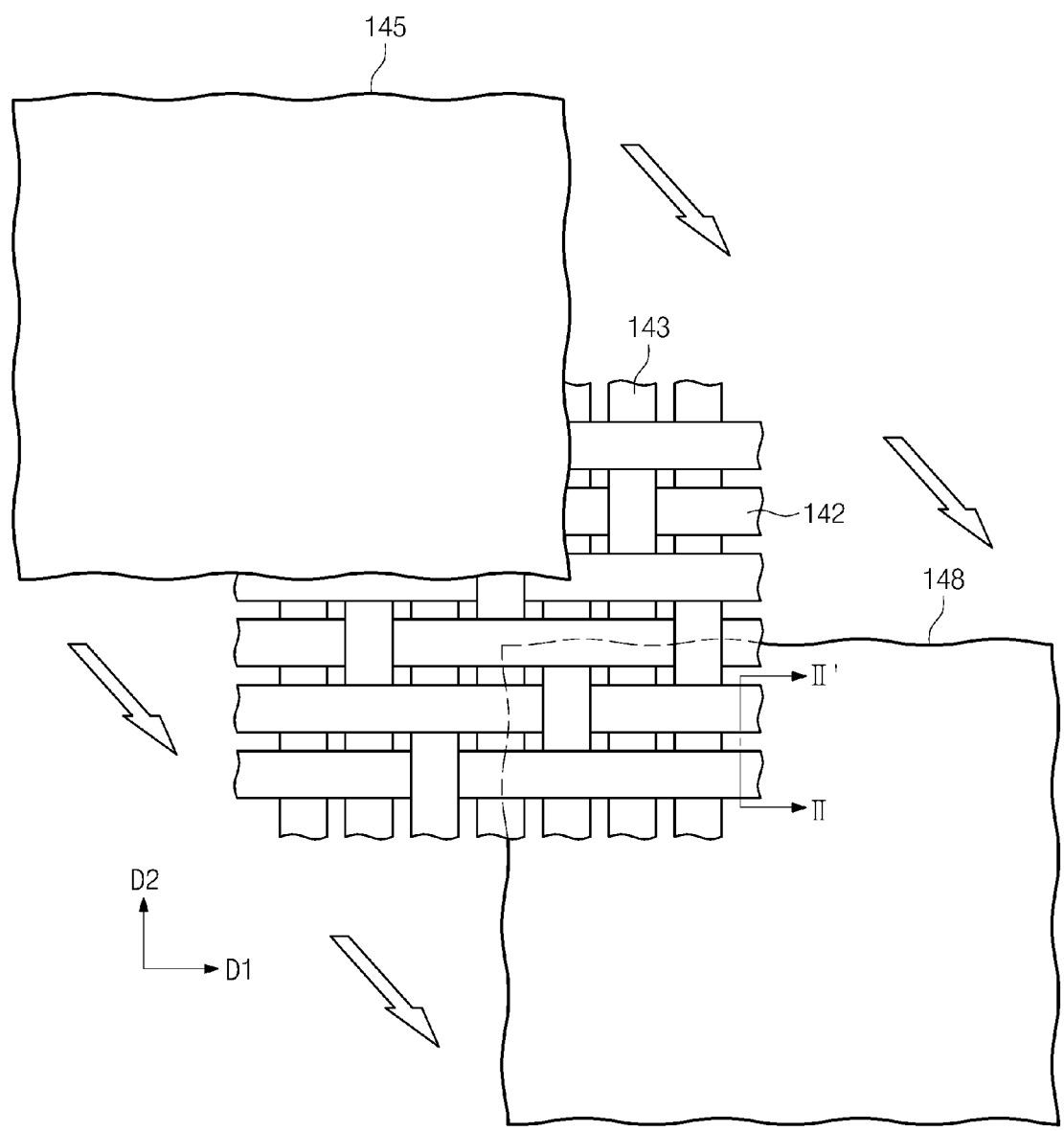
FIG. 10 is a view illustrating an exemplary embodiment of a manufacturing process of a reflective polarizer of FIG. 3B.

FIG. 10 is a view illustrating an exemplary embodiment of a manufacturing process of the reflective polarizer 140 of FIG. 3B. In FIG. 10, the same reference numerals denote the same elements in FIGS. 3A and 3B, and thus the detailed descriptions of the same elements will be omitted.

Referring to FIG. 10, the first optical member 142 and the second optical member 143 are prepared, either completely separately from each other, or at substantially a same time as each other. In preparing the first and second optical members 142 and 143, the first and second optical members 142 and 143 are connected to cross each other, such as in a weaving shape illustrated in FIG. 10, where portions of the first optical member 142 overlaps portions of the second optical member 143 in a plan view. The first optical member 142 includes the microfibers 144 (shown in FIG. 3B) that are elongated in the first direction D1 to have the anisotropic refractive index to the first direction D1. In contrast, the second optical member 143 includes a material that transmits the light therethrough and has the isotropic refractive index, such as polyethylene terephthalate ("PET") or CoPET that is the copolymer of PET and PC. Thus, unlike the first optical member 142, the second optical member 143 has the same refractive index in all directions.

After the first and second optical members 142 and 143 are connected to cross each other in a weaving shape, the upper protective layer 145 is positioned above the woven first and second optical members 142 and 143, and the lower protective layer 148 is positioned under the weaving portion of the first and second optical members 142 and 143 on side opposite to the upper protective layer 145. The upper protective layer 145, the lower protective layer 148, and the second optical member 143 that have the same material, are melted together to be integrated with each other, where the first optical member 142 is interposed between the upper protective layer 145 and the lower protective layer 148. The original form of the second optical member 143 may become the intermediate material 147 disposed surrounding the first optical members 142, or a portion of the original form of the second optical member 143 may remain in the reflective polarizing layer 141.

The reason why the upper protective layer 145 and the lower protective layer 148 are pressed with the weaving portion of the first and second optical members 142 and 143 is as follows. Where the second optical member 143 is a fiber having a round shape in its cross section, a light reflectance increases due to the shape of the second optical member 143, to thereby decrease a light transmittance. When the upper protective layer 145 and the lower protective layer 148 are pressed with the weaving portion of the first and second optical members 142 and 143, the upper protective layer 145, the lower protective layer 148, and the second optical member 143 are melted together. As a result, the second optical member 143 has the same refractive index as the upper protective layer 145 and the lower protective layer 148, and thus the upper protective layer 145, the lower protective layer 148, and the second optical member 143 that are integrated with each other by the pressing may have improved light transmittance. After the melting of the protective layer 145, the lower protective layer 148, and the second optical member 143 together, less of the second optical member 143 than originally provided remains in the formed reflective polarizer 140.

Referring again to FIGS. 3A and 3B, as described earlier, the intermediate material 147, the upper protective layer 145, and the lower protective layer 148 may have the isotropic refractive index and may have the same refractive index. In contrast, the first optical member 142 has the anisotropic refractive index, so that the first optical member 142 may have the different refractive index from the intermediate material 147, the upper protective layer 145, and the lower protective layer 148 in any direction.

In one exemplary embodiment, when the first optical member 142 has a refractive index of about 1.7 to a certain direction since the first optical member 142 has the anisotropic refractive index to the certain direction, the intermediate material 147, the upper protective layer 145, and the lower protective layer 148 may have a refractive index of about 1.5 to the certain direction. Thus, the light that vibrates in the certain direction is totally reflected by a difference in refractive index, and as a result, the reflective polarizer 140 may selectively reflect the light that vibrates in the certain direction and transmit the light that vibrates in a different direction from the certain direction.

The thickness of the reflective polarizing layer 141 may be related to a resolution of the liquid crystal display panel 400. As the resolution of the liquid crystal display panel 400 increases, it is desirable for the liquid crystal display panel 400 to receive the light having a high brightness to display images. Also, as the thickness of the reflective polarizing layer 141 increases, a reflection characteristic of the reflective polarizing layer 141 may be improved. Thus, when the thickness of the reflective polarizing layer 141 increases according to the increase of the resolution of the liquid crystal display panel 400, the brightness of the light that is provided to the liquid crystal display panel 400.

Figure 4A:
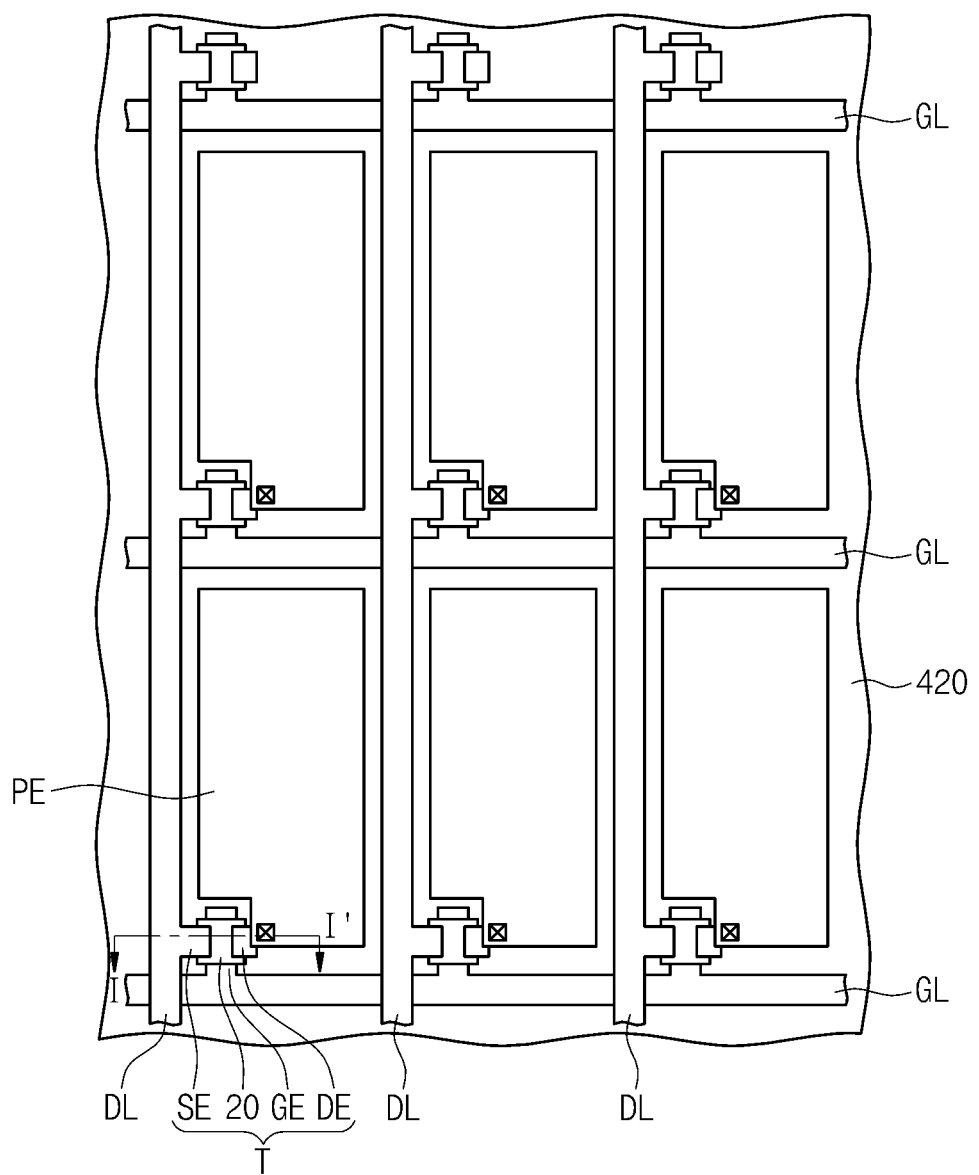
FIG. 4A is a partial plan view showing an exemplary embodiment of a first substrate of FIG. 3A.
Figure 4B:
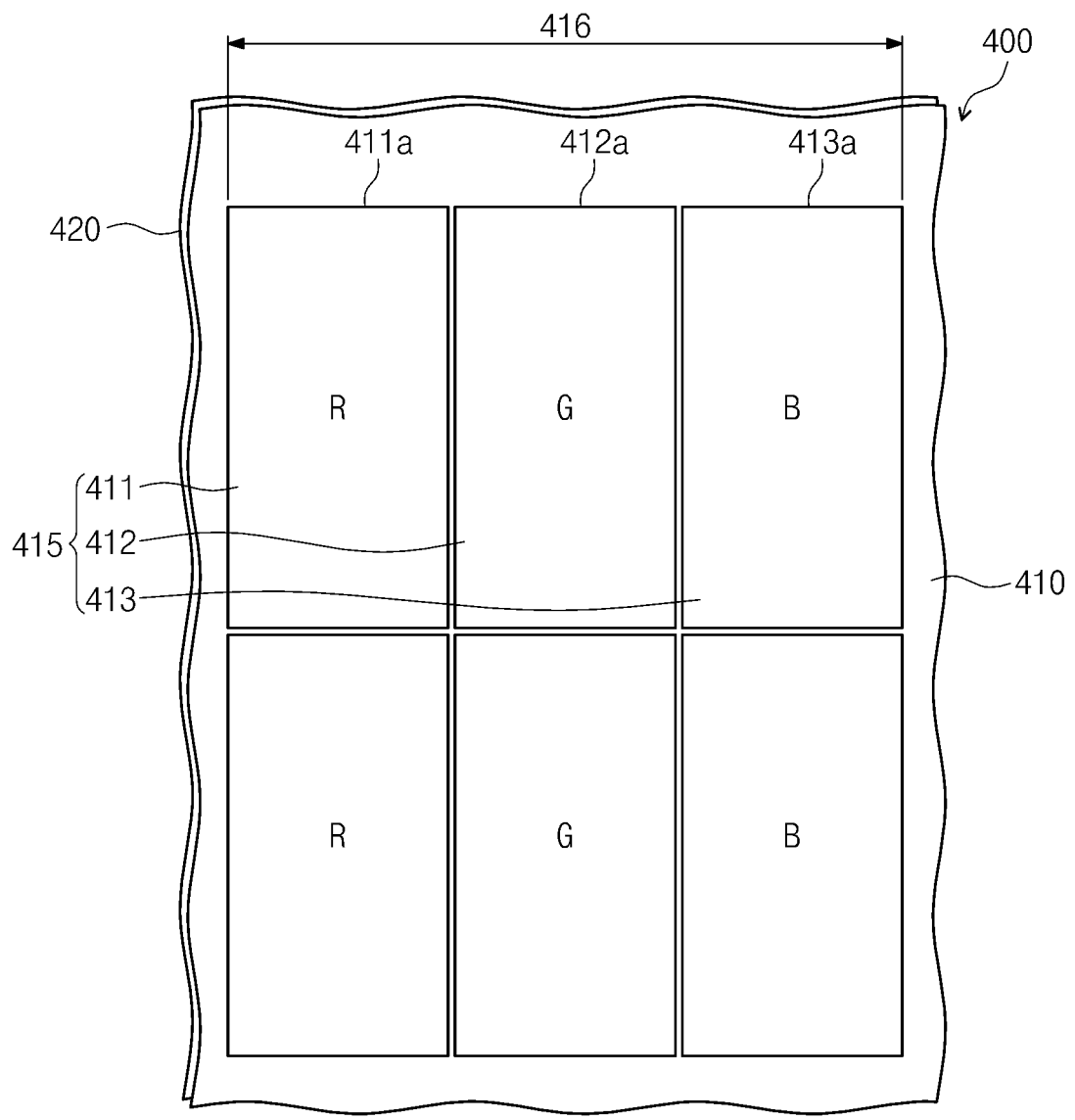
FIG. 4B is a partial plan view showing an exemplary embodiment of a liquid crystal display panel including the first substrate of FIG. 4A.

FIG. 4A is a partial plan view showing an exemplary embodiment of the first substrate 420 of FIG. 3A, and FIG. 4B is a partial plan view showing an exemplary embodiment of the liquid crystal display panel 400 having the first substrate 420 of FIG. 4A.

Referring to FIG. 4A, the first substrate 420 includes a plurality of sub-pixel areas each including the thin film transistor T, the pixel electrode PE electrically connected to the thin film transistor T, a gate line GL electrically connected to the thin film transistor T to provide a gate signal to the thin film transistor T, and a data line DL electrically connected to the thin film transistor T to provide a data signal to the thin film transistor T. A longitudinal direction of the gate line GL is arranged substantially perpendicular to a longitudinal direction of the data line DL. A sub-pixel area is considered as an independent area unit capable of independently controlling the liquid crystal. In an exemplary embodiment, the pixel areas may respectively correspond to color filters or color sub-pixels of the liquid crystal display.

The thin film transistor T includes a gate electrode GE branched from the gate line GL, a source electrode SE branched from the data line DL, a drain electrode DE spaced apart from the source electrode SE, and an active pattern 20 electrically connecting the source electrode SE and the drain electrode DE in response to the gate signal.

Referring to FIG. 4B, the liquid crystal display panel 400 includes the first substrate 420 and the second substrate 410 facing each other. The liquid crystal display panel 400 includes the plurality of the pixel 415. Each pixel 415 includes the plurality of sub-pixels 411, 412, and 413. In one exemplary embodiment, each pixel 415 may include a red pixel 411, a green pixel 412, and a blue pixel 413 that are successively arranged in a direction to which the gate line GL extends. In a plan view, each sub-pixel 411, 412, and 413 may correspond to the pixel electrode PE of the pixel electrodes shown in FIG. 4A and a color filter (not shown) of color filters arranged on the second substrate 410. In one exemplary embodiment, each sub-pixel 411, 412, and 413 may overlap and be aligned with a pixel area described above with respect to FIG. 4A, in the plan view.

In the present exemplary embodiment, the red pixel 411, the green pixel 412, and the blue pixel 413 may be repeatedly arranged in a direction parallel to the gate line GL. However, the red sub-pixel 411, the green sub-pixel 412, and the blue sub-pixel 413 may be repeatedly arranged in a direction parallel to the data line DL, or may be repeatedly arranged in a different direction to which the gate line GL and the data line DL extend.

The red sub-pixel 411 has a first side 411a, the green sub-pixel 412 has a second side 412a, and the blue sub-pixel 413 has a third side 413a. The first to third sides 411a, 412a, and 413a extend in the same direction in which the gate line GL extends and are positioned aligned along the same extended line.

As shown in the illustrated exemplary embodiment, when each pixel 415 includes the red sub-pixel 411, the green sub-pixel 412, and the blue sub-pixel 413 that are successively arranged in the direction parallel to the gate line GL, a pixel pitch 416 may be defined as a sum of the first side 411a, the second side 412a, and the third side 413a. Alternatively, the pixel pitch 416 may be defined as a distance along the direction parallel to the gate line GL, between a first edge (e.g., boundary) of the first sub-pixel and a second edge (e.g., boundary) of the third sub-pixel, inclusive of any spacing between adjacent sub-pixels, as shown by the double-arrowed line in FIG. 4B.

In the illustrated exemplary embodiment, the pixel 415, collectively including the sub-pixels 411, 412 and 413, has a substantially rectangular shape in a plan view of the liquid crystal display 400, however, a shape of the pixel 415 should not be limited thereto or thereby. In an exemplary embodiment where the pixel 415 has a different shape from the rectangular shape, the pixel pitch 416 may be defined as a length or width of a pixel including different colored sub-pixels to reproduce a color on color coordinates.

The brightness of the LCD 500 may be changed depending on the thickness of the reflective polarizing layer 141 (shown in FIG. 3B), and the thickness of the reflective polarizing layer 141, which corresponds to a maximum value of the brightness, may be decided depending on the pixel pitch 416. More detailed description about the above will be described in detail with reference to FIGS. 5A to 5C.

Figure 5A:
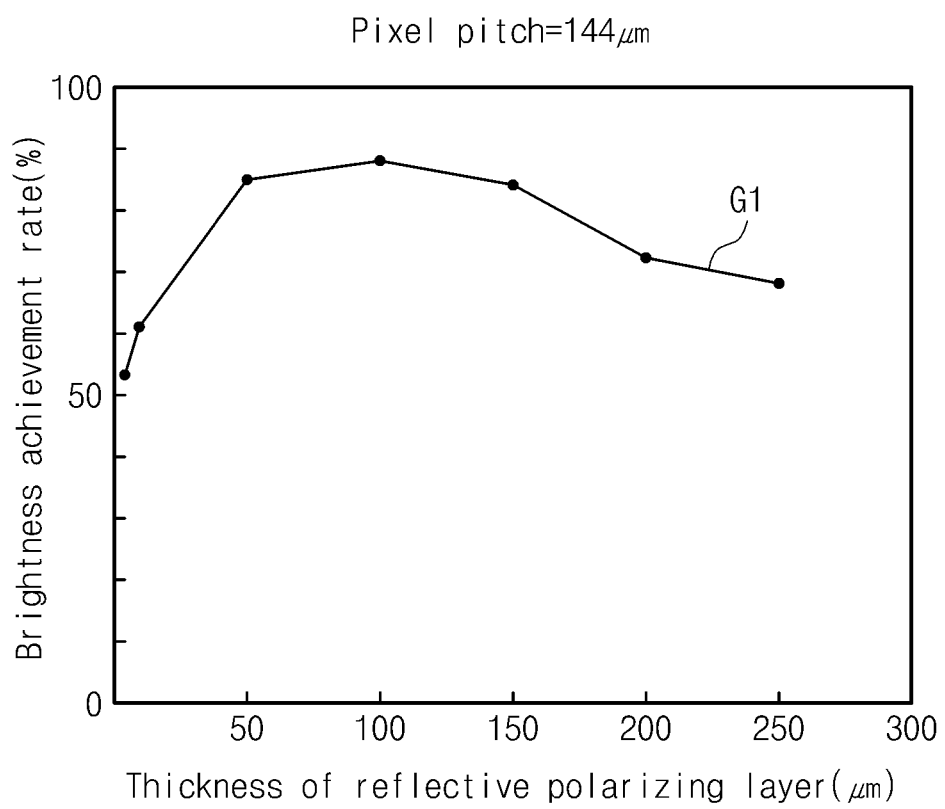
FIGS. 5A to 5C are graphs showing exemplary embodiments of a brightness achievement rate of a liquid crystal display, according to a thickness of a reflective polarizing layer.
Figure 5B:
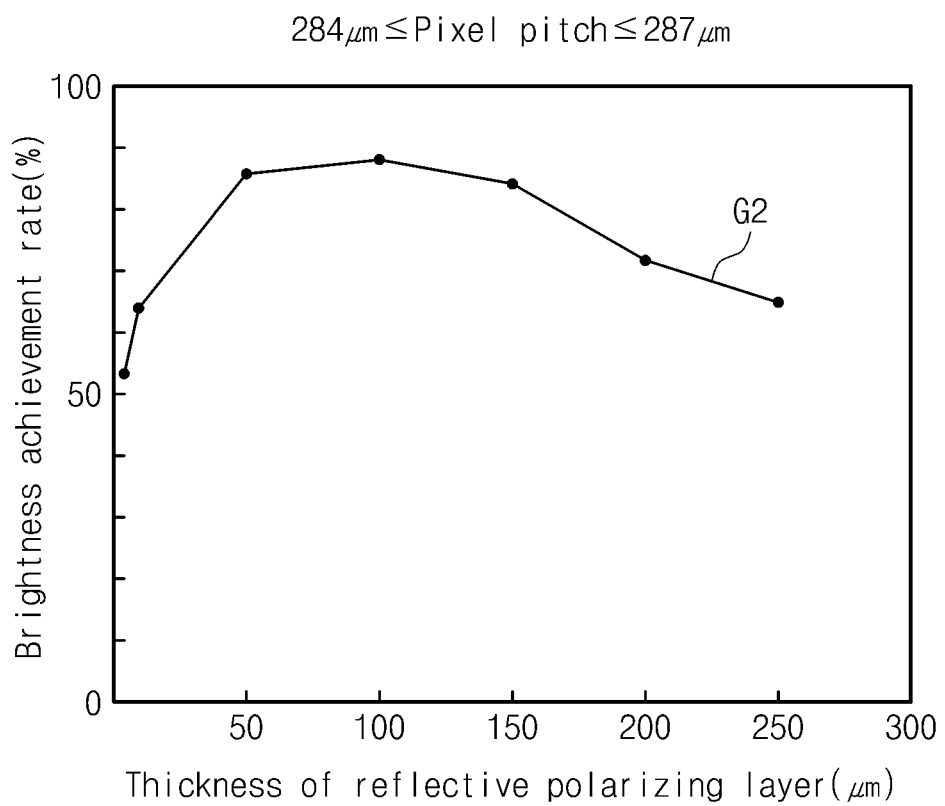
Figure 5C:
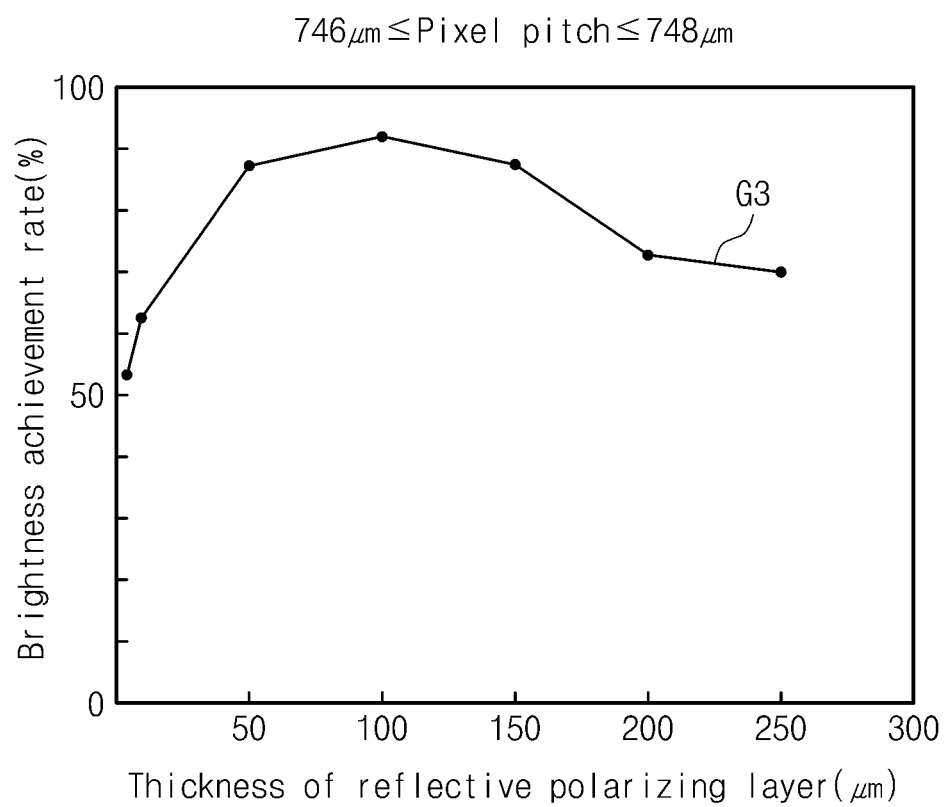

FIGS. 5A to 5C are graphs showing exemplary embodiments of a brightness achievement rate of the LCD 500, depending on the thickness of the reflective polarizing layer 141 of FIG. 3A.

In FIG. 5A, a first graph G1 shows a brightness achievement rate of the LCD 500 in units of percent (%), depending on the thickness of the reflective polarizing layer 141 in case that the pixel pitch 416 (shown in FIG. 4B) is of about 144 micrometers (μm). The brightness achievement rate is a ratio of a desirable brightness of the LCD 500 (shown in FIG. 1) by using the reflective polarizer 140, to a brightness of the LCD 500 that is actually measured. That is, as the brightness achievement rate increases, the increase in brightness of the LCD is accelerated by the reflective polarizer 140.

Referring to the first graph G1, in case that the reflective polarizing layer 141 has thicknesses of about 8 micrometers, about 15 micrometers, about 200 micrometers, and about 250 micrometers, the brightness achievement rates of the LCD 500 depending on the thicknesses of the reflective polarizing layer 141 are about 53%, about 61%, about 72%, and about 68%, respectively. In contrast, where the reflective polarizing layer 141 has thicknesses of about 50 micrometers, about 100 micrometers, and about 150 micrometers, the brightness achievement rates of the LCD 500 depending on the thicknesses of the reflective polarizing layer 141 are about 85%, about 88%, and about 84%, respectively.

In FIG. 5B, a second graph G2 shows the brightness achievement rate of the LCD 500 depending on the thickness of the reflective polarizing layer 141 when the pixel pitch 416 (FIG. 4B) is of about 284 micrometers to about 287 micrometers.

Referring to the second graph G2, if the reflective polarizing layer 141 has thicknesses of about 8 micrometers, about 15 micrometers, about 200 micrometers, and about 250 micrometers, the brightness achievement rates of the LCD 500 depending on the thicknesses of the reflective polarizing layer 141 are about 56%, about 63%, about 71%, and about 65%, respectively. In contrast, if the reflective polarizing layer 141 has thicknesses of about 50 micrometers, about 100 micrometers, and about 150 micrometers, the brightness achievement rates of the LCD 500 depending on the thicknesses of the reflective polarizing layer 141 are about 86%, about 88%, and about 84%, respectively.

In FIG. 5C, a third graph G3 shows the brightness achievement rate of the LCD 500 depending on the thickness of the reflective polarizing layer 141 in case that the pixel pitch 416 (shown in FIG. 4B) is of about 746 micrometers to about 748 micrometers.

Referring to the third graph G3, when the reflective polarizing layer 141 has thicknesses of about 8 micrometers, about 15 micrometers, about 200 micrometers, and about 250 micrometers, the brightness achievement rates of the LCD 500 depending on the thicknesses of the reflective polarizing layer 141 are about 54%, about 62%, about 72%, and about 70%, respectively. In contrast, when the reflective polarizing layer 141 has thicknesses of about 50 micrometers, about 100 micrometers, and about 150 micrometers, the brightness achievement rates of the LCD 500 depending on the thickness of the reflective polarizing layer 141 are about 88%, about 91%, and about 88%, respectively.

According to the first, second, and third graphs G1, G2, and G3 of FIGS. 5A to 5C, the brightness achievement rate of the LCD 500 (shown in FIG. 1) is changed depending on the thickness of the reflective polarizing layer 141 (shown in FIG. 3A), and the brightness achievement rate of the LCD 500 may be improved when the reflective polarizing layer 141 has a certain thickness. Also, in order to maximize the increase in the brightness of the LCD 500 by the reflective polarizer 140, an equation may be obtained as follows. The thickness T1 (shown in FIG. 3A) of the reflective polarizing layer 141 may be decided as a function of the pixel pitch, such as by using the equation detailed below.

Equation:

(2,000 micrometers−pixel pitch)×0.01≦thickness of the reflective polarizing layer≦(2,000 micrometers−pixel pitch)×0.1

In the Equation, the "pixel pitch" is the length described in FIG. 4B (element 416), and since the LCD 500 (shown in FIG. 1) includes the reflective polarizer 140 (shown in FIG. 1), the brightness of the LCD 500 is wholly increased. In addition, when the reflective polarizer 140 is applied to the LCD 500, the brightness of the LCD 500 may be more effectively improved by using the Equation considering the pixel pitch.

Figure 6A:
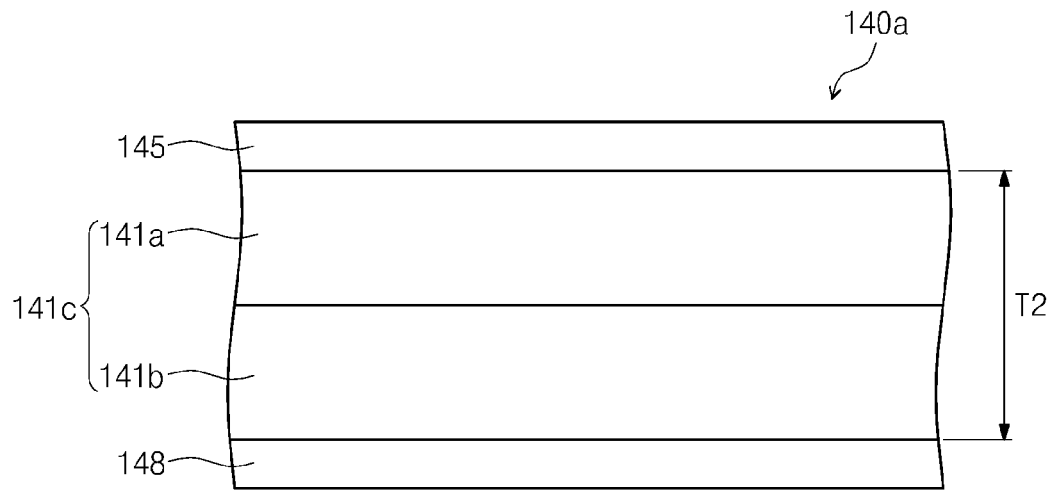
FIGS. 6A and 6B are cross-sectional views showing a reflective polarizing layer having a different thickness from the reflective polarizing layer of FIG. 3A.
Figure 6B:
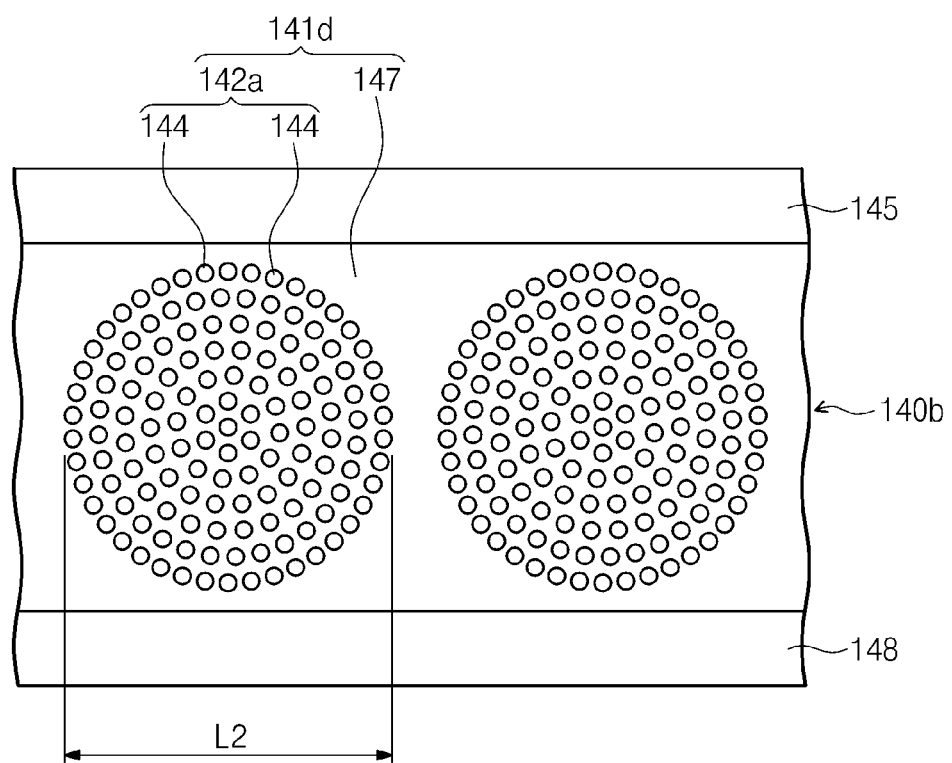

FIGS. 6A and 6B are cross-sectional views each showing a reflective polarizing layer having a different thickness from the reflective polarizing layer of FIG. 3A.

Referring to FIG. 6A, a reflective polarizer 140*a* includes a reflective polarizing layer 141*c*, an upper protective layer 145, and a lower protective layer 148. The reflective polarizing layer 141*c* collectively includes a plurality of a sub-reflective polarizing layer, such as a first sub-reflective polarizing layer 141*a* and a second sub-reflective polarizing layer 141*b*. Each of the first and second sub-reflective polarizing layers 141*a* and 141*b* may have a substantially same thickness in a thickness direction, and a structure as that of the reflective polarizing layer 141 shown in FIG. 3A. Each of the first sub-reflective polarizing layer 141*a* and the second sub-reflective polarizing layer 141*b* is a single unitary indivisible member.

The reflective polarizing layer 141*c* includes the first and second sub-reflective polarizing layers 141*a* and 141*b* that are sequentially stacked, and may define a second thickness T2 in the thickness direction that is larger than the first thickness T1 (shown in FIG. 3A). That is, the thickness of the reflective polarizing layer 141*c* may be controlled depending on the number of sub-reflective polarizing layers, such as first and second sub-reflective polarizing layers 141*a* and 141*b*.

In addition, where the reflective polarizer 140*a* includes multiple sub-polarizing layers, a reflectivity of the reflective polarizer 140*a* may be further increased. More particularly, as described earlier with reference to FIG. 3B, since the refractive index of the first optical member 142 (shown in FIG. 3B) is different from the refractive index of the upper protective layer 145 (shown in FIG. 3B), the lower protective layer 148 (shown in FIG. 3B), and the intermediate material 147 (shown in FIG. 3B), the reflective polarizer 140 (shown in FIG. 3) reflects the light by using a total reflection phenomenon caused by the differences in refractive index. Thus, as shown in FIG. 6A, in case that the reflective polarizer 140*a* includes the first and second sub-reflective polarizing layers 141*a* and 141*b*, the light passing through the first sub-reflective polarizing layer 141*a* may be reflected by the second sub-reflective polarizing layer 141*b*, thereby improving the light reflectivity of the reflective polarizer 140*a*.

Referring to FIG. 6B, a reflective polarizing layer 141*d* includes a plurality of a first optical member 142*a* having a plurality of a microfiber 144. The first optical member 142*a* having the microfibers 144 collectively has a round shape in its cross section with a diameter of a second length L2.

The cross-sectional diameter of the first optical member 142*a* increases as the number of the microfibers 144 included in the first optical member 142*a* increases. In one exemplary embodiment, a number of the microfibers 144 included in one of the first optical member 142*a* is larger than a number of microfibers 144 (shown in FIG. 3B) included in one of the first optical member 142 shown in FIG. 3B. Therefore, the second length L2 is larger than the first length L1 (shown in FIG. 3B) of the diameter of the first optical member 142 (shown in FIG. 3B).

As described above, as the number of the microfibers 144 included in the first optical member 142*a* increases, the cross-sectional diameter of the first optical member 142*a* increases. In addition, as the cross-section diameter of the first optical member 142*a* increases, the thickness of the reflective polarizing layer 141*d* including the first optical member 142*a* may increase.

Figure 7:
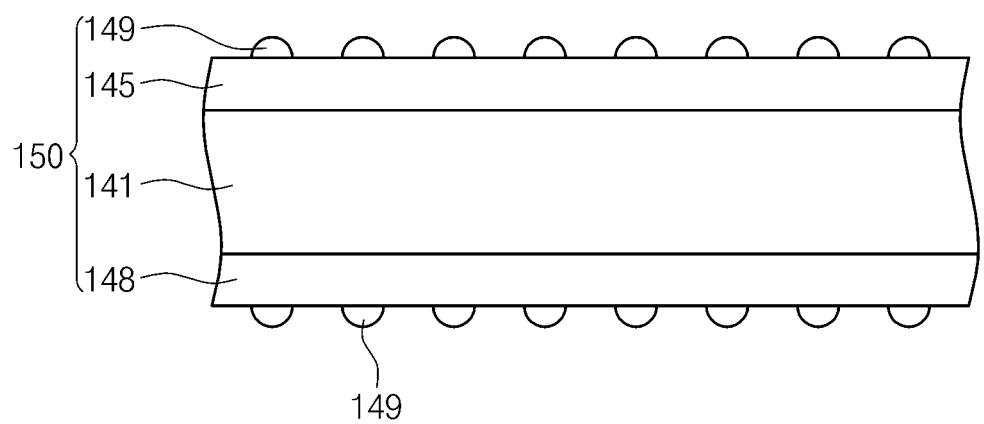
FIG. 7 is a cross-sectional view showing another exemplary embodiment of a reflective polarizing layer according to the invention.

FIG. 7 is a cross-sectional view showing another exemplary embodiment of a reflective polarizing layer according to the invention.

Referring to FIG. 7, a reflective polarizer 150 includes a reflective polarizing layer 141, an upper protective layer 145 disposed directly on an upper surface of the reflective polarizing layer 141, a lower protective layer 148 disposed directly on a lower surface of the reflective polarizing layer 141, and a plurality of a convex portion 149 disposed directly on outer surfaces of both the upper and lower protective layers 145 and 148. Each of the convex portions 149 extend from the outer surfaces, and extend in a direction away from the outer surface, respectively, in a cross-sectional view. Alternatively, the convex portions 149 may be disposed on an outer surface of only one of the upper and lower protective layers 145 and 148.

The convex portions 149 may each be individual discrete convex protrusions, having various shapes in a plan view of the reflective polarizer 150. The shapes may include, but are not limited to, circular and elliptical. Alternatively, the convex portions 149 (e.g., semi-circular in cross-section) may each be longitudinally extended across an entire of the outer surface of the upper and/or lower protective layers 145 and 148.

The convex portions 149 may reduce or effectively prevent contact of the reflective polarizer 150 with other elements of the LCD 500, since the convex portions 149 directly contact the other elements of the LCD 500, instead of the reflective polarizer 150 contacting the other elements of the LCD 500. Especially, the convex portions 149 arranged on the surface of the upper protective layer 145 may prevent the reflective polarizer 150 from making contact with the liquid crystal display panel 400 (shown in FIG. 1), thereby reducing or effectively preventing deterioration of display quality of the liquid crystal display panel 400.

The reflective polarizer 150 may have a surface roughness of about 0.1 micrometer to about 50 micrometers due to the convex portions 149. Where the surface roughness of the reflective polarizer 150 is less than about 0.1 micrometer, a structure and/or function of the convex portions 149 may be deteriorated by an external circumstance which could damage the convex portions 149, thereby causing an increase an area where the reflective polarizer 150 makes contact with the liquid crystal display panel 400. As a result, defects in external appearance of the liquid crystal display panel 400 may be observed. In addition, where the surface roughness of the reflective polarizer 150 is over about 50 micrometers, the degree of the scattering in the light generated from the backlight assembly 200 (shown in FIG. 1) is increased by the convex portions 149, to thereby deterioration in brightness of the liquid crystal display panel 400.

Figure 8:
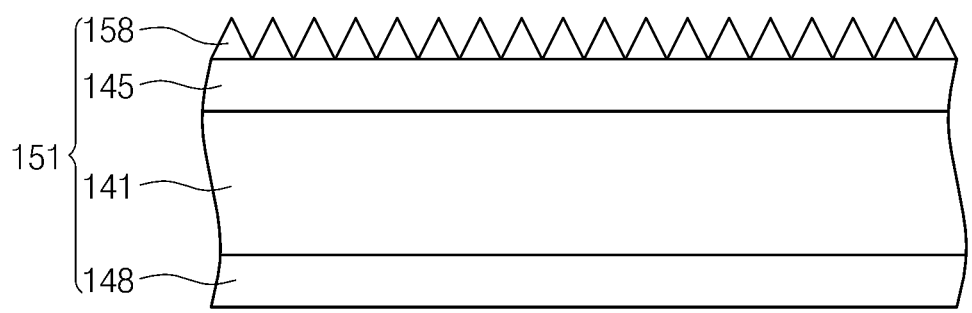
FIG. 8 is a cross-sectional view showing another exemplary embodiment of a reflective polarizing layer according to the invention.

FIG. 8 is a cross-sectional view showing another exemplary embodiment of a reflective polarizing layer according to the invention.

Referring to FIG. 8, a reflective polarizer 151 includes a plurality of a prism pattern 158 disposed directly on an outer surface of an upper protective layer 145. The prism patterns 158 change the path of the light exiting from the upper protective layer 145 after passing through both a lower protective layer 148 and a reflective polarizing layer 141. More particularly, the prism patterns 158 condense the light transmitting the reflective polarizer 151 and exiting to an external of the reflective polarizer 151, such that the path of the light may be substantially vertical to the reflective polarizer 151, thereby improving a front brightness of the LCD 500.

The prism pattern 158 may include each of an individual discrete prismatic protrusion, having various shapes in a plan view of the reflective polarizer 150. The shapes may include, but are not limited to, a pyramid. Alternatively, each of the prism patterns 158 (e.g., triangular in cross-section) may be longitudinally extended across an entire of the outer surface of the upper and/or lower protective layers 145 and 148.

Figure 9:
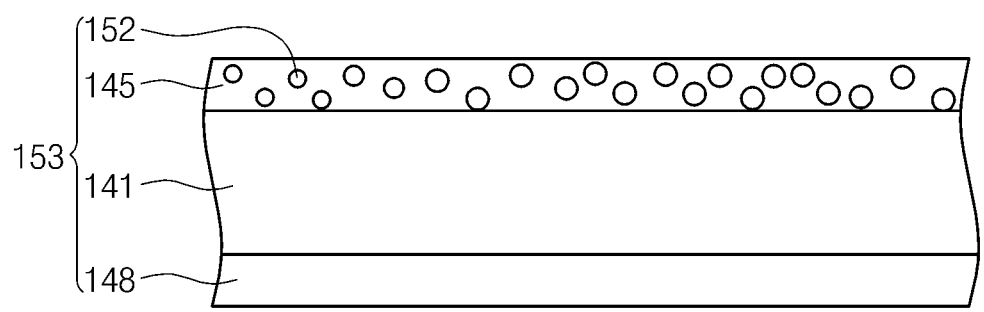
FIG. 9 is a cross-sectional view showing another exemplary embodiment of a reflective polarizing layer according to the invention.

FIG. 9 is a cross-sectional view showing another exemplary embodiment of a reflective polarizing layer according to the invention.

Referring to FIG. 9, a reflective polarizer 153 includes a plurality of a diffusion member 152 distributed completely within an upper protective layer 145. The diffusion members 152 diffuse the light exiting from the upper protective layer 145 after passing through a lower protective layer 148 and a reflective polarizing layer 141. Thus, the light provided to the liquid crystal display panel 400 (shown in FIG. 1) may become more uniform by the reflective polarizer 153. The diffusion members 152 may include voids (e.g., no material) in the upper protective layer 145, or may include diffusive materials distributed within the upper protective layer 145.

Alternatively, different from those in FIG. 9, the diffusion members 152 may be distributed in the reflective polarizing layer 141, and no diffusion members 152 may be distributed within the upper protective layer 145. Where no diffusion members 152 are distributed within the upper protective layer 145, the diffusion members 152 may be arranged together with the microfibers 144 (shown in FIG. 3B) within the reflective polarizing layer 141, and the light transmitting the reflective polarizer 153 may be diffused by the diffusion members 152. The diffusion members 152 may include a plurality of the microfiber 144 within a boundary of each diffusion member 152, or both the diffusion members 152 and a plurality of the first optical members 142 (shown in FIG. 3B) separate from the diffusion members 152, may be disposed within the reflective polarizing layer 141.

According to the above, the reflective polarizer may improve a light-use efficiency of the light used to display the images in the LCD, thereby improving the brightness of the LCD. In addition, the thickness of the reflective polarizing layer of the reflective polarizer may be determined depending on the pixel pitch of the liquid crystal display panel, to thereby maximize the brightness in the LCD.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A liquid crystal display comprising:
   a light source generating a light;
   a liquid crystal display panel comprising a pixel including a plurality of sub-pixels, the liquid crystal display panel receiving the light from the light source to display images thereon; and
   a reflective polarizer arranged between the light source and the liquid crystal display panel to transmit or reflect the light according to a direction in which the light vibrates, wherein the reflective polarizer comprises:
      a reflective polarizing layer including a plurality of microfibers each having an anisotropic refractive index within the reflective polarizing layer, each of the plurality of microfibers longitudinally extending in a same direction with respect to each other; and
      a protective layer having an isotropic refractive index and overlapping the reflective polarizing layer,
   wherein
   a thickness of the reflective polarizing layer of the reflective polarizer is between about (2,000 micrometers–a pixel pitch)×0.01 and about, (2,000 micrometers–a pixel pitch)×0.1, and
   the pixel comprises two adjacent sides extending in different directions from each other, and the pixel pitch is defined by a length of one of the two adjacent sides.

2. The liquid crystal display of claim 1, wherein
   the pixel comprises a first sub-pixel, a second sub-pixel, and a third sub-pixel, which are successively arranged substantially parallel to a first direction, and
   the pixel pitch defined by the length of the one of the two adjacent sides is taken parallel to the first direction.

3. The liquid crystal display of claim 1, wherein the reflective polarizing layer comprises a plurality of sub-reflective polarizing layers which are sequentially stacked.

4. The liquid crystal display of claim 1, further comprising a prism sheet disposed between the light source and the liquid crystal display panel, and condensing the light generated by the light source.

5. The liquid crystal display of claim 4, wherein the reflective polarizer is disposed between the liquid crystal display panel and the prism sheet.

6. The liquid crystal display of claim 1, wherein the reflective polarizer further comprises protruding portions extending from an outer surface of the protective layer and directly contacting the liquid crystal display panel.

7. The liquid crystal display of claim 6, wherein the outer surface of the protective layer has a surface roughness of about 0.1 micrometer to about 50 micrometers due to the protruding portions.

8. The liquid crystal display of claim 1, wherein
   the microfibers have a longitudinal linear shape and extend in a first direction to have the anisotropic refractive index in the first direction, and
   the protective layer transmits the light.

9. The liquid crystal display of claim 8, wherein the liquid crystal display panel further comprises:
   a first polarizer disposed on a light incident surface of the liquid crystal display panel; and
   a second polarizer disposed on a light exit surface of the liquid crystal display panel, and the first polarizer has an absorption axis which is substantially parallel to the first direction.

10. The liquid crystal display of claim 1, wherein the reflective polarizer further comprises a prism pattern disposed on an outer surface of the protective layer, and condensing the light generated by the light source.

11. The liquid crystal display of claim 1, wherein the reflective polarizer further comprises a diffusion member dispersed within the protective layer, the diffusion member diffusing the light.

* * * * *